US011287069B2

(12) United States Patent
Závorka et al.

(10) Patent No.: US 11,287,069 B2
(45) Date of Patent: Mar. 29, 2022

(54) METHOD FOR CONNECTING A HOSE WITH A PIPE SOCKET BY A PRESSURE SLEEVE; PIPE SOCKET, PRESSURE SLEEVE AND COMBINATION OF THE TWO

(71) Applicant: Hanon Systems, Daejeon (KR)

(72) Inventors: Zdenek Závorka, Dolní Becva (CZ); Augustin Machynák, Senov u Nového Jicína (CZ)

(73) Assignee: Hanon Systems, Daejeon (KR)

( * ) Notice: Subject to any disclaimer, the term of this patent is extended or adjusted under 35 U.S.C. 154(b) by 752 days.

(21) Appl. No.: 15/983,877

(22) Filed: May 18, 2018

(65) Prior Publication Data
US 2018/0356020 A1 Dec. 13, 2018

(30) Foreign Application Priority Data
Jun. 7, 2017 (DE) .................. 102017209579.2

(51) Int. Cl.
*F16L 33/213* (2006.01)
*F16L 33/207* (2006.01)
*F16L 21/02* (2006.01)

(52) U.S. Cl.
CPC ............. *F16L 33/213* (2013.01); *F16L 21/02* (2013.01); *F16L 33/2076* (2013.01)

(58) Field of Classification Search
CPC ...... F16L 33/213; F16L 33/2076; F16L 21/02
USPC .................................................. 285/256, 259
See application file for complete search history.

(56) References Cited

U.S. PATENT DOCUMENTS

| 3,237,974 | A | | 3/1966 | Press | |
|---|---|---|---|---|---|
| 4,407,532 | A | * | 10/1983 | Patel | F16L 33/2076 285/256 |
| 2015/0292661 | A1 | * | 10/2015 | Gilbreath | F16L 33/213 285/90 |

FOREIGN PATENT DOCUMENTS

| DE | 2104744 A1 | 8/1972 | |
|---|---|---|---|
| DE | 2423347 | 12/1974 | |
| DE | 10351102 | 6/2004 | |
| DE | 102011087176 | 5/2012 | |
| FR | 1281042 A * | 1/1962 | .......... F16L 33/2076 |
| FR | 2197143 A1 * | 3/1974 | .......... F16L 33/2076 |
| JP | 4437613 B2 | 3/2010 | |
| KR | 2000-0030464 | 6/2000 | |
| KR | 20060095016 A | 8/2006 | |

(Continued)

*Primary Examiner* — James M Hewitt, II
(74) *Attorney, Agent, or Firm* — Norton Rose Fulbright US LLP; James R. Crawford

(57) ABSTRACT

A method for connecting a hose with a tubular coupling with a pressure sleeve. The pressure sleeve is crimped at least at two sites separate from one another in the axial direction such that at least two crimp bands extending in the circumferential direction are developed, wherein each crimp band completely caps at least one peripheral groove that is developed on the inner surface of the pressure sleeve. Also disclosed is a method for connecting a hose with a tubular coupling with a pressure sleeve that is crimped at least at three sites separate from one another in the axial direction such that at least three crimp bands extending in the circumferential direction are developed, wherein at least one crimp band completely caps at least one peripheral groove that is developed on the inner surface of the pressure sleeve. Tubular couplings, pressure sleeves and combinations are also provided.

10 Claims, 1 Drawing Sheet

(56) References Cited

FOREIGN PATENT DOCUMENTS

KR        101660475 B1    10/2016
WO     2016049264 A1    3/2016

\* cited by examiner

METHOD FOR CONNECTING A HOSE WITH A PIPE SOCKET BY A PRESSURE SLEEVE; PIPE SOCKET, PRESSURE SLEEVE AND COMBINATION OF THE TWO

This Application claims priority from German Patent Application No. 102017209579.2 filed Jun. 7, 2017, which is hereby incorporated by reference in its entirety.

FIELD OF TECHNOLOGY

The invention relates to a method for connecting a hose with a tubular fitting or coupling by means of a pressure sleeve, as well as to a tubular coupling, a pressure sleeve, and a combination of same.

PRIOR ART

It is frequently necessary, in particular in the field of motor vehicle air-conditioning systems, to connect flexible hoses that conduct refrigerants, for example, with tubular couplings that may be provided on condensers, evaporators, and pumps. The described connection is conventionally carried out thereby that the hose is slid onto the tubular coupling and the pressure sleeve crimped onto the hose by applying pressure. The particular challenge encountered herein is ensuring the secure retention of the hose on the tubular coupling even under comparatively high pressures.

KR 10-2006-0095016 A describes grooves that can be provided on the tubular coupling and JP 4437613 B2 relates to grooves on the inside of the pressure sleeve.

DESCRIPTION OF THE INVENTION

Against this background the invention addresses the problem of providing a method as well as the components to be utilized therefor, with which the secure retention of a hose on a pressure-side coupling is ensured.

The problem is resolved, for one, through the method described herein.

Accordingly, the method according to the invention is distinguished thereby that the pressure sleeve is crimped at least at two sites separated from one another in the axial direction, and that of the generated crimp bands, in the case of two such bands each crimp band, completely caps at least one peripheral groove that is developed on the inner surface of the pressure sleeve. In the case of three or more crimp bands at least one crimp band caps completely at least one peripheral groove that is developed on the inner surface of the pressure sleeve. By the described capping is understood that the particular crimp band has a width in the axial direction that is greater or equal to the width of the peripheral groove in the axial direction and that the peripheral groove does not project from the region of the crimp band in the axial direction. The pressure-side coupling can also be referred to as nipple and the crimping applied according to the invention can also be referred to as compressing or squeezing. The critical issue in this context is only that pressure is applied at the periphery in such manner that a deformation zone is developed in the form of a band, wherein the generated crimp band does not necessarily need to extend over the entire circumference.

In both of the above described variants through the congruent position of at least one crimp band and one peripheral groove, developed on the inner surface of the pressure sleeve, the friction between the pressure sleeve and the hose as well as between the hose and the tubular coupling or nipple, that are disposed in this sequence from the outside toward the inside, can be increased to an exceptional degree.

Therewith the reliability of the connection is increased. This applies, for example, to air-conditioning systems in which the refrigerant R744 is used and in which the pressure is up to ten times higher than is the case in conventional air-conditioning systems in which, for example, R134a or R1234yf is used. Through the method according to the invention the reliable connection between hose and tubular coupling can therewith be advantageously maintained even at especially high pressures without the pressure sleeve having to be lengthened and/or without the NVH (noise, vibration, harshness, the occurrence of noise due to oscillations) being negatively affected and/or without being forced to use expensive metal hoses or pipes. By avoiding longer pressure sleeves, and the longer free length of the hose resulting therefrom, the NVH attenuation can be improved.

Instead, within the scope of the invention, a resilient hose of a polymer, as well as a pressure-side coupling of aluminum, can advantageously be employed. As stated above, thereby that on the inner side of at least one crimp band a peripheral groove is developed on the pressure sleeve, the friction at the hose, and therewith also between the hose and the tubular coupling, is increased. It should be stated that in the case of three or more crimp bands, these have preferably substantially the same spacing from one another.

In view of the tubular coupling the problem defined above is essentially resolved through the appropriate characteristics stated herein. This applies equally to the pressure sleeve. It should be stated here that in view of the method all characteristics described precedingly and subsequently are equally applicable to the two, in each case, other subject matters and herein unfold their advantages.

The tubular coupling preferably comprises at least one O-ring implemented of an elastic material, such as rubber, that is provided in the circumferential direction about the tubular coupling. The O-ring can preferably be disposed in a peripheral groove in the tubular coupling.

In view of the pressure sleeve according to the invention, it is preferred that it comprises on its inner surface at least one peripheral groove provided between two bands to be crimped. The effect of enhanced friction according to the invention can hereby be increased.

With regard to the peripheral groove(s), it has further been found to be of advantage if at least one peripheral groove has substantially a U-shaped cross section. Stated differently, the bottom of the groove extends substantially parallel to the axial direction of the pressure sleeve and the side walls of the groove substantially perpendicular thereto. In particular the last stated measure can also only apply to one side wall and be combined with a different, for example curved, in particular semicircular, bottom and/or with a bottom oriented differently from the one described. In particular, a respective groove can comprise a side wall, located on the side the free length of the hose, that is developed deeper than the side wall located on the side of the tubular coupling such that the bottom of the groove, viewed in longitudinal section in the direction of the hose, is inclined downwardly on the underside of the pressure sleeve and, on the upper side, is inclined upwardly such that an especially secure anchoring is established.

BRIEF DESCRIPTION OF THE DRAWING

In the following the invention will be described in further detail in conjunction with an embodiment example depicted in the drawing. Therein show.

DETAILED DESCRIPTION OF A PREFERRED EMBODIMENT OF THE INVENTION

Figure 1:
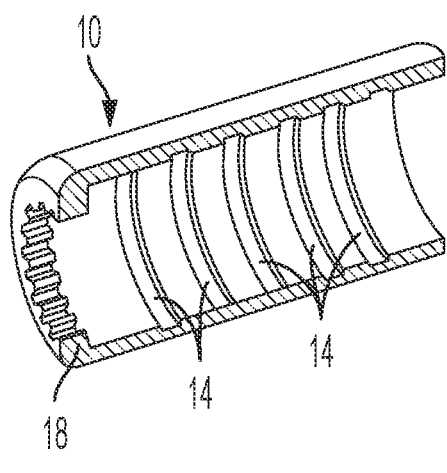
FIG. 1 a pressure sleeve according to the invention before crimping.

As shown in FIG. 1, the pressure sleeve 10 according to the invention has a substantially cylindrical form before crimping. For better understanding, in FIG. 1 only one longitudinal half is depicted, generated through a longitudinal section, including substantially the center axis of the pressure sleeve. The wall thickness of the pressure sleeve is essentially constant with the exception of, in the depicted case, five peripheral grooves 14 provided on the inner side. On the left end according to FIG. 1, the pressure sleeve comprises a type of collar 18 with a toothed inner perimeter.

Figure 2:
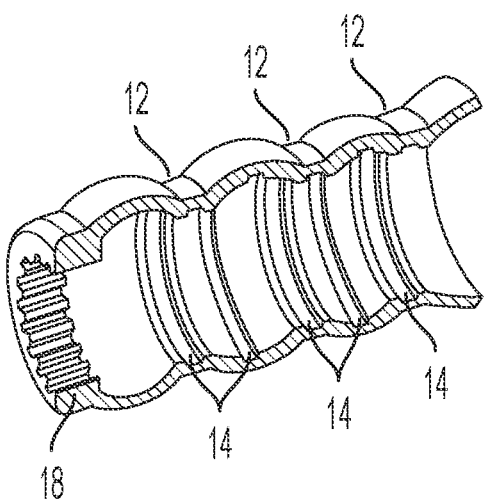
FIG. 2 the pressure sleeve according to FIG. 1 after crimping.

As depicted in FIG. 2, the depicted pressure sleeve 10 is crimped at three separate sites such that crimp bands 12 have been generated. In the depicted case all crimp bands 12 cap respective peripheral grooves 14 formed on the inner periphery. In the depicted example, additionally, two peripheral grooves 14 are further provided between two crimp bands 12. It should be mentioned for the sake of completeness that the pressure sleeve 10 has also been crimped in the proximity of the collar 18 provided at the left end.

Figure 3:
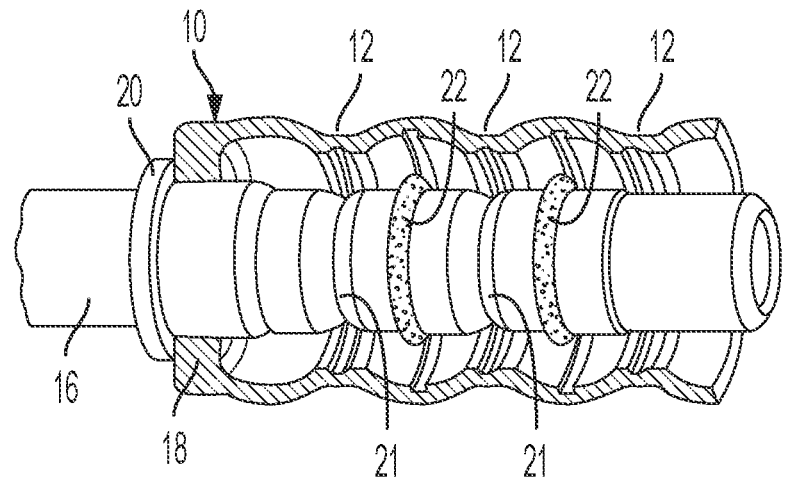
FIG. 3 a combination of the pressure sleeve of FIGS. 1 and 2 with a tubular coupling.

As can be seen in FIG. 3, which additionally shows the tubular coupling 16, the position of the pressure sleeve 10 in the axial direction is defined thereby that the collar 18 abuts a ring 20 developed on the tubular coupling 16. There is, in reality, between the tubular coupling 16 and the pressure sleeve 10 the end of a hose, not shown in FIG. 3. Security, reliability and leak tightness of the connection can be attained, for one, through the above described measures, wherein it can additionally be seen in FIG. 3 that in the proximity of two crimp bands 12 a substantially shallow V-shaped groove 21 is developed in the tubular coupling 16. In the depicted example, further, on the tubular coupling 16 in each case two rubber rings 22 are provided between each two crimp bands, which are received in the depicted example in grooves in the tubular coupling.

The invention claimed is:

1. A tubular coupling with which a hose is connected by a pressure sleeve, wherein the pressure sleeve is crimped at least at two sites separated from one another in the axial direction such that at least two crimp bands are developed extending in the circumferential direction, wherein each crimp band completely caps at least one peripheral groove developed on the inner surface of the pressure sleeve; and
wherein in the proximity of two of the at least two crimp bands a V-shaped groove is developed in the tubular coupling;
wherein the at least one peripheral groove has a narrower width than that of the V-shaped groove, and
wherein an O ring is provided in the V-shaped groove.

2. A tubular coupling as in claim 1, wherein at least one O-ring is provided about the tubular coupling in the circumferential direction.

3. A combination of a pressure sleeve with at least two bands extending in the circumferential direction and are crimped and each completely capping at least one peripheral groove developed on the inner surface of the pressure sleeve, and the tubular coupling according to claim 2.

4. A combination of a pressure sleeve with at least two bands extending in the circumferential direction to be crimped and each completely capping at least one peripheral groove developed on the inner surface of the pressure sleeve, and the tubular coupling according to claim 1.

5. The combination of claim 4 having a hose secured therein between.

6. A tubular coupling with which a hose is connected with a pressure sleeve, wherein the pressure sleeve is crimped at least at three sites separated from one another in the axial direction such that at least three crimp bands are developed extending in the circumferential direction, wherein at least one crimp band completely caps at least one peripheral groove developed on the inner surface of the pressure sleeve; and
wherein in the proximity of two of two of the at least three crimp bands a V-shaped groove is developed in the tubular coupling;
wherein the at least one peripheral groove has a narrower width than that of the V-shaped groove, and
wherein an O ring is provided in the V-shaped groove.

7. A combination of a pressure sleeve with at least two bands extending in the circumferential direction and are crimped and each completely capping at least one peripheral groove developed on the inner surface of the pressure sleeve, and the tubular coupling according to claim 6.

8. A method for connecting a hose with a tubular coupling with a pressure sleeve, wherein the pressure sleeve is crimped at least at two sites separate from one another in the axial direction such that at least two crimp bands extending in the circumferential direction are developed, wherein each crimp band completely caps at least one peripheral groove that is developed on the inner surface of the pressure sleeve;
wherein in the proximity of two of the at least two crimp bands a V-shaped groove is developed in the tubular coupling;
wherein the at least one peripheral groove has a narrower width than that of the V-shaped groove, and
wherein an O ring is provided in the V-shaped groove.

9. A method according to claim 8, wherein the V-shaped groove faces the crimp band.

10. A method for connecting a hose with a tubular coupling with a pressure sleeve, wherein the pressure sleeve is crimped at least at three sites separate from one another in the axial direction such that at least three crimp bands extending in the circumferential direction are developed, wherein at least one crimp band completely caps at least one peripheral groove developed on the inner surface of the pressure sleeve; and
wherein in the proximity of two of the at least two crimp bands a V-shaped groove is developed in the tubular coupling;
wherein the at least one peripheral groove has a narrower width than that of the V-shaped groove, and
wherein an O ring is provided in the V-shaped groove.

* * * * *